N. HODGE.
ATMOSPHERICAL RAILWAY CAR BRAKE.
No. 28,670. Patented June 12, 1860.
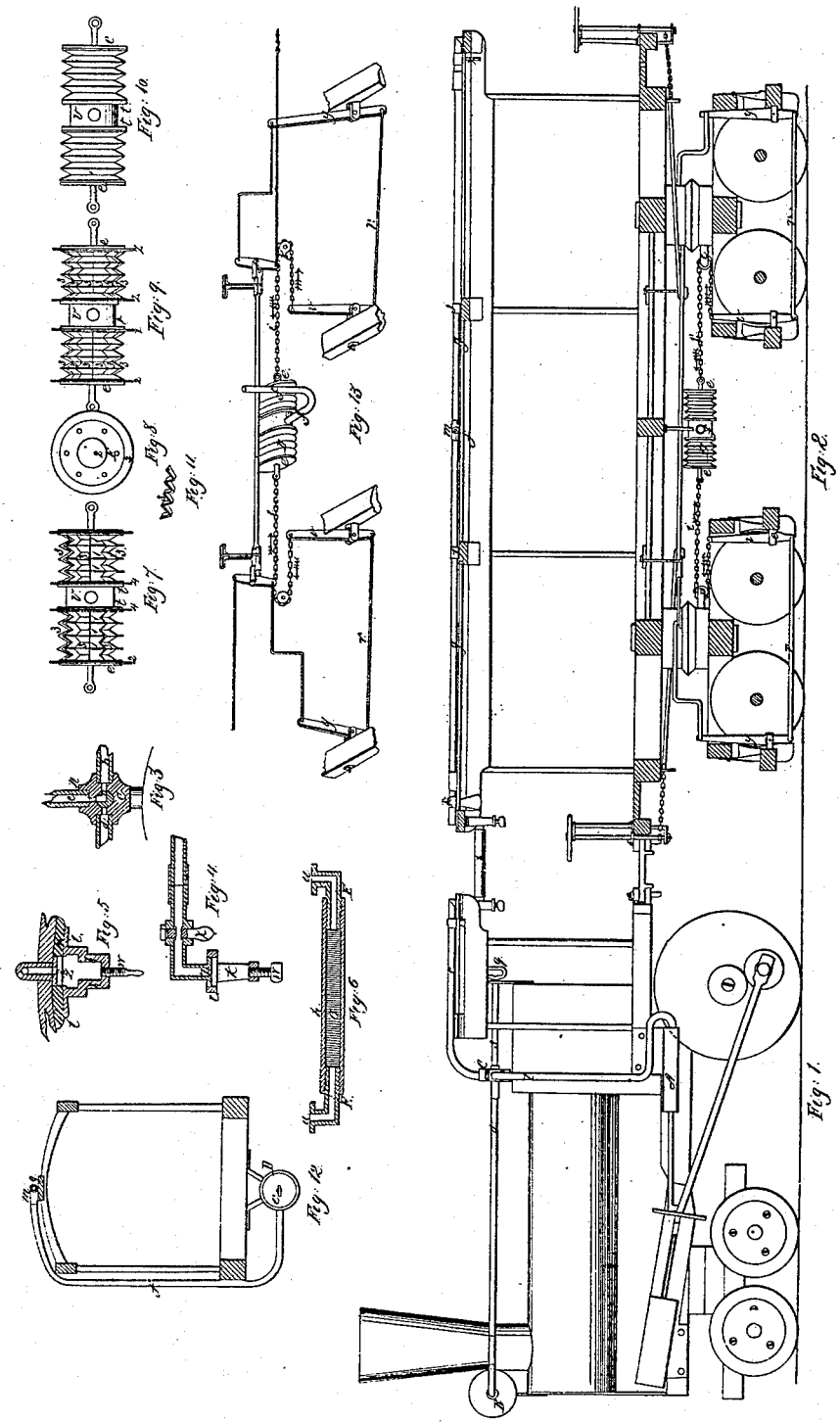

UNITED STATES PATENT OFFICE.

NEHEMIAH HODGE, OF NORTH ADAMS, MASSACHUSETTS.

IMPROVEMENT IN RAILROAD-BRAKES.

Specification forming part of Letters Patent No. 28,670, dated June 12, 1860.

*To all whom it may concern:*

Be it known that I, NEHEMIAH HODGE, of North Adams, in the county of Berkshire and State of Massachusetts, have invented a new and useful apparatus or system of mechanism for operating the brake machinery and brakes of railway-carriages; and I hereby declare the following to be a full, clear, and exact description of such apparatus and of the manner of putting the same into practice, reference being had to the accompanying drawings, making a part of this specification.

My invention consists in a combination of certain mechanical devices, contrivances, or fixtures placed upon a locomotive-engine and upon the car or cars attached thereto or connected therewith whereby I employ common atmospherical pressure as the force to operate the brake machinery and brakes of such car or cars.

Of the mechanical devices or contrivances which I combine in the construction of my apparatus some are old and well known and some I consider to be entirely new, while the system of apparatus itself, taken as a whole, for the purpose above named or for any similar purpose, I claim to be altogether new and of my own invention.

Of the drawings referred to, Figure 1 shows the principal parts in a side elevation of a locomotive-engine and so much of the machinery of such engine as is connected with my apparatus and is required to work the same, while Fig. 2 exhibits a longitudinal sectional view of the skeleton or frame-work of an eight-wheel car with the ordinary brake machinery and brakes attached thereto, and upon the two figures taken together is represented my apparatus or system of mechanism for operating the brake machinery and brakes of such car.

I place upon and attach firmly to the locomotive at any convenient point a common air-pump, A, connecting the piston of such pump to any part of the machinery of the locomotive having a reciprocating motion, such as is required to work a pump. I have connected the piston of the pump in the present instance to the pitman of one of the driving-wheels near the cross-head, thereby securing the working of the pump whenever the locomotive is in motion, so as to rotate the driving-wheels. I also place upon the locomotive and attach firmly thereto at any convenient point the air-chamber B, connecting such chamber with the pump A by the tubes *a b*, so that the working of the pump will exhaust the air from the chamber B and create and maintain as nearly as is practicable by such means a constant vacuum or approximate vacuum in the chamber B, for a purpose hereinafter explained.

At any convenient point upon the locomotive, as at or near the apex of the boiler, I place the cock C, uniting in such cock the tubes *b c d*, as shown in Fig. 3. The body or key of the cock C is provided with two ways or channels, *n o*, which ways or channels intersect each other at right angles in the center of the body or key, and both ways terminate at that point. A stem, S, projects from the body of C, terminating in the handle *c*, and so near the engineer's stand as to enable him to control its movements.

The tube *a* is jointed to the tube *b* at any convenient point outside of the cock C, so that when the body or key of the cock is adjusted with the way *n* opening into the tube *d* and the way *o* opening into the tube *c* the communication between the tubes *b* and *c* is closed; and hence when this is done by the working of the pump A a vacuum or approximate vacuum is created and maintained in the chamber B. The tube *d* opens into and communicates with the external atmosphere. The tube *c* extends along the middle of the cab-roof to within a short distance of the end of the roof, and terminates in a lateral disk, facing downward, on the under side of the roof, as shown in Fig. 4. This disk I surround with the plate *l*, as shown in Fig. 5, which plate has an opening in the middle of sufficient diameter to receive the disk. The thickness of the plate somewhat exceeds the thickness of the disk, so that when the plate is placed over and around the disk it forms a countersink, having the face of the disk for the bottom of such countersink. The bottom of this countersink I face with a flat ring of india-rubber, such ring having an opening in the center corresponding to the opening in the center of the disk or end of the tube *c*. Projecting downward from the plate *l* and firmly attached thereto is a stirrup or yoke, *k*, having a thumbscrew, *w*, passing upward through the middle of the yoke and directly under the center of the disk, for a purpose hereinafter explained, such yoke and thumb screw being shown both in Figs. 4 and 5.

From the under side of the body of the car, Fig. 2, I suspend a flexible air chamber, D. This chamber is so constructed as to contract and expand longitudinally, while it remains rigid and incompressible radially, and hence, when exhausted or approximately exhausted of air, the disks or heads $e\ e$ will be forced toward each other by atmospherical pressure acting externally against the heads. To a stem projecting from the center of each of the heads $e\ e$, I attach the chains $i\ i$, passing the chains in opposite directions from thence over the pulleys $p\ p$ on the bolster-beams of the trucks, and the free ends of the chains so passed over the pulleys I connect to the upper extremities of the brake-levers $v\ v$, hinged on the inner brake-bars and resting against the inside of the inner end beams of the truck-frames. The lower extremities of the levers $v\ v$ are connected by the rods $r\ r$ to the lower extremities of the brake-levers $y\ y$, hinged on the outer brake-bars and having their upper extremities resting against the inside of the outer end beams of the truck-frames.

It is now plain that if force be applied to the upper extremities of the levers $v\ v$ through the chains $i\ i$, acting in the direction of the arrows, such force will act upon the brake-bars to force the brake heads, shoes, or rubbers against their respective wheels, and the requisite force to produce such a result is gained by creating a vacuum or approximate vacuum in the flexible air-chamber D, when the disks or heads $e\ e$ will be forced toward each other by atmospherical pressure acting externally against the heads. The maximum amount of force gained by this means will depend upon the diameter or superficial extent of the disks or heads $e\ e$ and the degree of vacuum created in the chamber D, and in applying this mode of operating the brake machinery and brakes of railway carriages I first ascertain as nearly as it is possible to do the maximum amount of force which it is necessary to apply to the upper extremities of the brake-levers $v\ v$ to operate the brakes effectively under ordinary circumstances. I then construct the chamber D with disks or heads of sufficient diameter or superficial extent to give the maximum amount of force with an external pressure on the heads of only ten pounds on the square inch. This amount of external atmospherical pressure is gained by creating a two-thirds vacuum in the chamber D—a degree of vacuum easily attainable by the means which I employ for that purpose, which means are the constant working of the pump A when the locomotive is in motion, either in running forward or backward, and in conjunction with the pump the exhausted air-chamber B, to be brought into communication with the flexible air-chamber D whenever it is required to apply the brakes or to bring them down upon their respective wheels.

The communication between the flexible air-chamber D and the pump A and the exhausted air-chamber B is effected through the intervening tubes, $f$ and $g$, on the car and the coupling-tube $h$ between the tube $g$ on the car and the tube $c$ on the locomotive, in conjunction with the cock C, adjusted with the way $o$, opening into and corresponding to the tube $b$, and the way $n$, opening into and corresponding to the tube $c$, as shown in Fig. 3, closing the communication between the tubes $c$ and $d$, and consequently cutting off the communication between the external atmosphere and the flexible air-chamber D, the tube $f$ being more fully shown in Fig. 12. The air in the chamber D now escapes into the exhausted air-chamber B through the tubes $f$, $g$, $h$, $c$, $b$, and $a$, and is rapidly drawn from thence by the working of the pump A, (supposing the train to be in motion,) producing almost instantaneously a vacuum or approximate vacuum in the chamber D, whereupon the chamber suddenly contracts longitudinally under the atmospherical pressure acting externally against the heads $e\ e$, and through the chains $i\ i$ this pressure or force is carried to the brake-levers $v\ v$, bringing down the brakes upon their respective wheels with a force proportioned to the degree of vacuum created in the chamber D. To throw off this force and let up the brakes, it is only necessary to turn the cock C to the right one-quarter of the way round, so that the way $n$ will be adjusted to the opening in the tube $d$ and the way $o$ will be adjusted to the opening in the tube $c$. This adjustment of the cock will open a communication between the external atmosphere through the tubes $d$, $c$, $h$, $g$, and $f$ and the flexible air-chamber D, whereby the air rushing into the chamber D through this opening restores an equilibrium of atmospherical force or pressure to the internal surfaces of the disks or heads $e\ e$, and thereby neutralizes or balances the external pressure used to apply the brakes.

To graduate the force acting on the brakes to any desirable or given amount, and then to continue such amount in action any required length of time, it is only necessary to open momentarily the communication through the cock C between the flexible air-chamber D and the pump A and the exhausted air-chamber B until the chamber D contracts sufficiently to bring down the brakes to the degree of force required, at which point the communication may be instantly cut off by reversing the movement of the cock C and adjusting it so that the way $m$ will stand against the space between the tubes $c$ and $d$ and the way $o$ will stand against the space between the tubes $b$ and $c$, and hence by the successive movements and adjustments of the cock C, as above described, the brakes are placed completely under the control of the engineer.

It now remains to describe more particularly the parts and adaptations of the tubes $g$ and $h$, and also the manner of constructing the flexible air-chamber D.

The tube $g$ is coupled to the tube $f$ at $m$ and is firmly attached to the roof of the car by the brackets *j j*. The tube *g* terminates at each end in a lateral disk, facing downward, on the under side of the roof. Each disk is surrounded with a plate having a stirrup or yoke and thumb screw and faced with a flat ring of india-rubber, and in all respects fitted up precisely like the disk at the termination of the tube *c* on the cab, and for a like purpose. The tube *g* is provided with two cocks, *x x*, as seen in Fig. 2. The ways or channels of these cocks when open exactly coincide with the caliber of the tube. The object of these cocks is to cut off the communication between the tube *g* and the external atmosphere at the rear end of the car, and as each end of every car in running to and fro upon a railway becomes alternately the rear end and the face end a cock is required at each end of the tube *g* to meet the exigency arising from this change; but in coupling the tubes of two or more cars together the cocks are all to remain open excepting the rear cock in the hindermost car, which is to be closed.

The coupling-tube *h* is of india-rubber, and when exhausted of air is supported against atmospherical pressure by the wire coil G, as shown in Fig. 6, the caliber of such coil corresponding in size with the caliber of the tubes *c* and *g*. Such coil extends from end to end through the india-rubber tube, excepting so much of the latter as is employed over short sections of metal tube at each end. (Seen at F F.) These sections of metal tube terminate each in the lateral disk *u u*, and that portion of each which is inserted into the india-rubber tube has a deep screw thread cut upon it, so that when so inserted and then wound closely around with strong twine or wire over the rubber tube it becomes firmly jointed to the latter.

In coupling the tubes *c* and *g* together the disks *u u* are placed one in the countersink at the termination of the tube *c* under side the cab-roof and the other in the countersink at the termination of the tube *g* under side the end of the car-roof and directly over the thumb-screws *w* in the stirrups or yokes *k*, and by turning up the screws the disks are pressed against the india-rubber facings at the bottoms of the countersinks, so as to make air-tight joints, which joints by the backward movement of the screws may be easily detached, and again by the forward movement of the screws, when the disks are replaced in the countersinks, are easily readjusted. This explains the manner in which the tube *g* is coupled from car to car.

Fig. 7 shows the skeleton or frame-work of the flexible air-chamber D with one-half the series of spring brackets or knees which form the walls of the chamber and unite the disks *e e* to the band U, while Fig. 9 shows the whole series of knees forming the walls of the chamber, and Fig. 10 shows such chamber finished and ready for use. Fig. 8 shows the internal surface of the disks *e e*, and Fig. 11 shows a series of steel spring knees or brackets bent, punched, and shaped ready for being riveted to the band U and either of the disks *e*.

Each of the disks *e e* has its internal surface lined with a disk of leather or vulcanized india-rubber cloth, 2, in Fig. 8, such leather or cloth disk projecting some inch (more or less) beyond the metal disk around its outer edge, as seen in Fig. 7, for the purpose of being joined to the covering of the body of the chamber. I cover the metal disks *e e* with india-rubber cement on their internal surfaces when the leather or cloth disks are laid on, and in addition to the adhesiveness of the cement uniting the cloth and metal disks to each other I place a flat concentric metal ring, E, Fig. 8, of the exact diameter of the metal disk, on and over the cloth disk, and rivet such ring and metal disk firmly to each other, as shown in Fig. 8, the cloth disk intervening between the ring and metal disk.

The band U forms the middle section of the walls of the chamber. It is somewhat less in diameter than the disks *e e* and has a flange, *t t*, at each end turning outwardly, the outer edges of which are of the exact diameter of the disks *e e*. Each of the flanges *t t* is faced with a concentric ring of leather or india-rubber cloth laid on and secured to the flanges in the same manner and for the same purpose that the leather or cloth disks are laid upon and secured to the metal disks *e e*. Such leather or cloth rings are seen at 4 4 in Figs. 7 and 9.

The disks *e e* are now joined to the flanges of the band U by intervening series of steel spring knees or brackets, 3 3 3, as shown in Figs. 7 and 9, each series being formed entire from a strip of sheet-steel, as shown in Fig. 11. One end of each series of knees is riveted to one of the disks *e* and the other end is riveted to one of the flanges *t*, as shown in Fig. 7, and also in Fig. 9. These series of knees, when placed in close proximity entirely around the outer diameter or circumference of the flanges *t t* and disks *e e*, form the walls of the chamber D, and are supported radially against the atmospherical pressure when a vacuum is created in the chamber D by the flat concentric metal rings 1 1 1, inclosed within each outer circle of knees, as seen in Fig. 7.

In covering the walls of the chamber D, I first employ concentric rings of leather. The outer circumference of such rings is a trifle larger than the circumference of the outer circles of knees, and the inner circumference of such rings corresponds to the circumference of the inner circles of knees. This gives a breadth of ring somewhat exceeding the width of the sides of the angular grooves formed by the knees or brackets, so that when the rings are cut radially and then opened and placed over and around the sides of the angular grooves their upper edges and lower edges may be lapped and cemented together. I next turn down the edges of the cloth disks 2 2 and the edges of the cloth rings 4 4 and join them to leather rings, over which they lap, by cement. This leather covering I again surround with a covering of vulcanized-india-rubber cloth laid on in concentric rings cut, lapped, and cemented in the same manner in which the leather covering was done, only with greater care and perfection. The flexible air-chamber D, as shown in Fig. 10, is now completed and ready for use, and, in combination with the air-pump, is applicable to various uses other than the one above designated.

The walls of the chamber D, instead of being formed of series of spring-knees, as above described, may be formed of series of hinge-jointed knees, and instead of having the disks $e\ e$ and the band U circular they may be square or many-sided.

The series of knees 3 3 3 should not have the edges of their inner or lesser circles of knees come in contact with each other when the chamber is distended to its maximum length, but should have sufficient spaces intervening to allow the inner or lesser circles to contract into lesser diameters and to descend toward the axis of the chamber when the disks $e\ e$ are forced toward each other.

The system of hand-brakes to which my apparatus is applied in the drawings is substantially the same as that patented to Nehemiah Hodge originally on the 2d day of October, A. D. 1849, and shown by a plan view in Fig. 13; but my apparatus is applicable to any system of hand-brakes, whether double-acting or single-acting; and, if double-acting, instead of making the application through the chains $i\ i$ and the levers $v\ v$, as shown in the drawings, the application may be made to any system of double acting hand-brakes through one of the chains $i$ or its equivalent connecting one of the disks $e$ of the flexible air-chamber to any point in such system of hand-brakes, through which the due operation of the brakes is or may be effected by the ordinary chain and windlass. In this latter application the flexible air-chamber D may be constructed with only one movable disk $e$ and the other disk may be combined with the band U.

Having thus described my apparatus and the mode of putting the same into practice, what I claim therein as new and as my invention, and desire to secure by Letters Patent, is—

1. The flexible air-chamber D, constructed substantially as described, whereby, in combination with the air pump, I employ common atmospherical pressure as the force to operate the brake machinery and brakes of railway-carriages, as herein set forth.

2. The combination of the pump A, chamber B, cock C, and flexible air-chamber D, arranged, combined, and operated as and for the purpose above named.

In testimony whereof I have hereunto set my signature this 18th day of May, A. D. 1860.

NEHEMIAH HODGE.

Witnesses:
 JOSEPH N. CHAPIN,
 EZRA D. WHITAKER.